Figure 1:
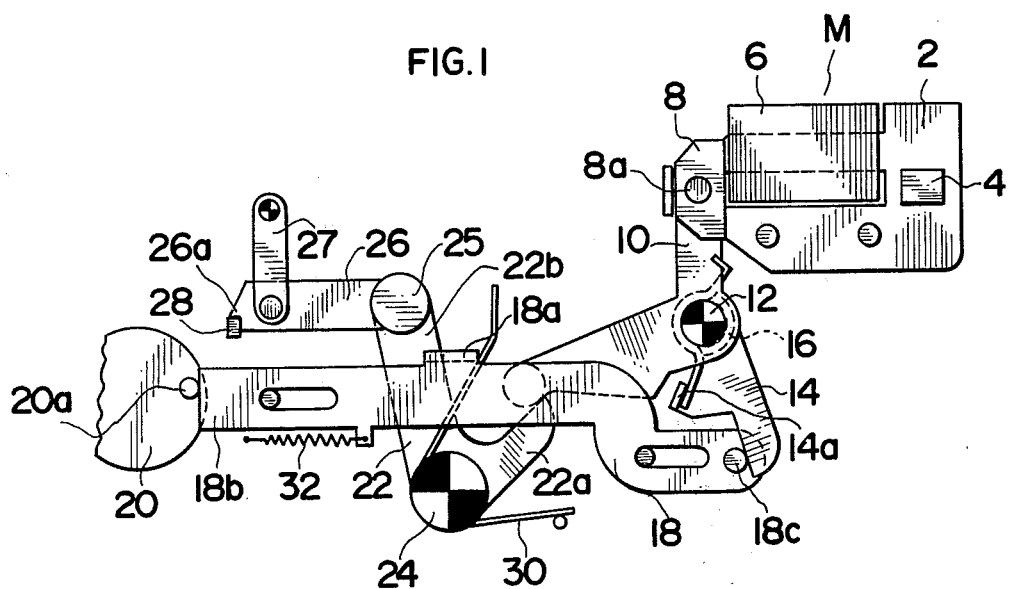

United States Patent [19]

Inagaki et al.

[11] 4,160,983
[45] Jul. 10, 1979

[54] ELECTROMAGNETIC RELEASE MECHANISM FOR PHOTOGRAPHIC CAMERAS

[75] Inventors: Tetsuhiko Inagaki; Keisuke Maeda, both of Sakai, Japan

[73] Assignee: Minolta Camera Kabushiki Kaisha, Azuchi, Japan

[21] Appl. No.: 864,434

[22] Filed: Dec. 27, 1977

[30] Foreign Application Priority Data

Dec. 29, 1976 [JP] Japan ................... 51-159831

[51] Int. Cl.$^2$ .................... G03B 9/08; G03B 17/38
[52] U.S. Cl. .................... 354/234; 354/266
[58] Field of Search .............. 354/204, 205, 234, 235, 354/266, 153

[56] References Cited
U.S. PATENT DOCUMENTS

| | | | |
|---|---|---|---|
| 3,698,304 | 10/1972 | Tenkumo | 354/234 |
| 3,838,436 | 9/1974 | Ogihara et al. | 354/266 X |
| 3,947,857 | 3/1976 | Kiyoshi et al. | 354/266 X |

*Primary Examiner*—Donald A. Griffin
*Attorney, Agent, or Firm*—Wolder, Gross & Yavner

[57] ABSTRACT

A release mechanism for initiating a camera operation by means of an electromagnetic device which includes a permanent magnet for retaining a release member in an inoperative position, and a solenoid for, upon energization thereof, counterbalancing the magnetic force of the permanent magnet to allow the release member to move to its operating position where it releases an operating member to actuate a camera mechanism, such as shutter mechanism or mirror driving mechanism. With the camera operation, the release member is returned to its inoperative position by an elastic member, and retained again by the permanent magnet for the next camera operation. The elastic member is maintained inoperative at least until the release member releases the restraint on the operating member.

7 Claims, 4 Drawing Figures

ELECTROMAGNETIC RELEASE MECHANISM FOR PHOTOGRAPHIC CAMERAS

BACKGROUND OF THE INVENTION

1. Field of the Invention

The present invention generally relates to improvements in electromagnetic release mechanisms for cameras and it relates more particularly to an improved camera release mechanism of the type having an electromagnetic device which includes a permanent magnet for retaining a release member in a cocked retracted or inoperative position against a biasing force, and an electromagnetic coil energizable for producing an electromagnetic force or field opposite to the magnetic force or field of the permanent magnet to release the release member and allow it to move to its operating position where it initiates a camera operation, such as the shutter opening or the retraction of a reflex mirror and/or the stopping down of a diaphragm prior to the shutter operation in a single lens reflex camera.

2. Description of Prior Art

In the conventional electromagnetic release mechanisms of the above type, the release member is always biased or urged by a spring towards its operating position, i.e. in a direction to move away from the electromagnetic device which normally retains the release member by the force of the permanent magnet. Thus the release member must be returned to its inoperative position by a force overcoming the force of the biasing spring. Thus, if it is contemplated in the conventional camera to return the release member automatically in relation to a camera operation, such as the termination of exposure, such camera requires the returning mechanism to have a great power to overcome the force of the biasing force, resulting in an increase in the power required for the camera cocking operation. This increase of power is unfavorable from the view point of a smooth camera operation. If a weaker spring is selected for the biasing of the release lever in order to lessen the power required for the camera cocking operation, then the operation of the release lever is unreliable and causes a delay in the initiation of the camera operation and may even possibly fail to actuate the camera.

Improved electromagnetic release mechanisms including an associated permanent magnet and electromagnetic coil, but free of the above drawbacks, have been proposed in pending U.S. Patent Application Ser. Nos. 805,954 and 821,109 now respectively, U.S. Pat. Nos. 4,133,609 and 4,132,474, issued respectively on Jan. 9, 1979 and Jan. 2, 1979 which are assigned to the same assignee as that of the present application.

In the proposed mechanisms, the release member is free from the force of a biasing spring during its return operation, with the biasing spring being charged with the camera cocking operation. Thus, less power is required for the return of the release member and also for the camera cocking operation.

The improved mechanism of the present invention broadly functions in a manner similar to the heretofore proposed mechanisms but with a simpler construction which is more practical and is suitable for mass production.

SUMMARY OF THE INVENTION

An object of the present invention is to provide a camera release mechanism wherein a release member is movable, upon energization of electromagnetic means, from a retracted inoperative position where the member has been retained by the force of a permanent magnet, to an operating position where the member initiates a camera operation, and the release member is returnable to the inoperative position with the biasing spring being inoperative at that time.

Another object of the present invention is to provide such an electromagnetic release mechanism which is simple in construction and reliable in operation and is suited for mass production.

Still another object of the present invention is to provide such electromagnetic release mechanism which is free from the above explained disadvantages of the conventional mechanisms.

Figure 2:
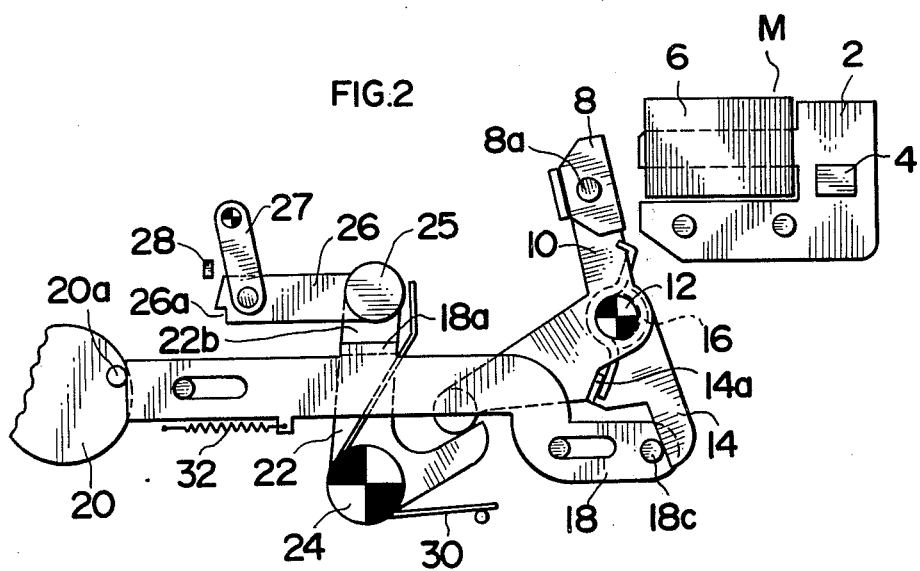
Figure 3:
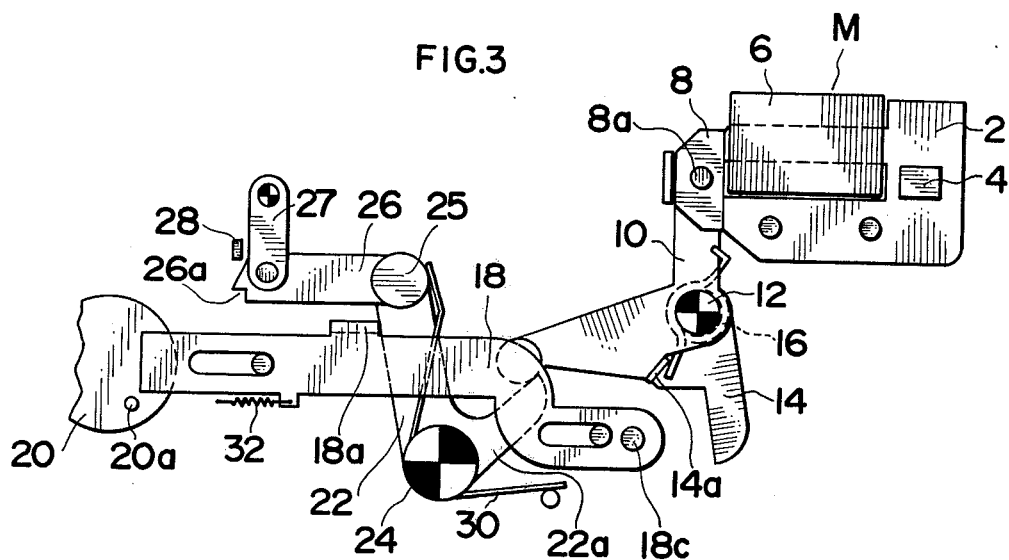
Figure 4:
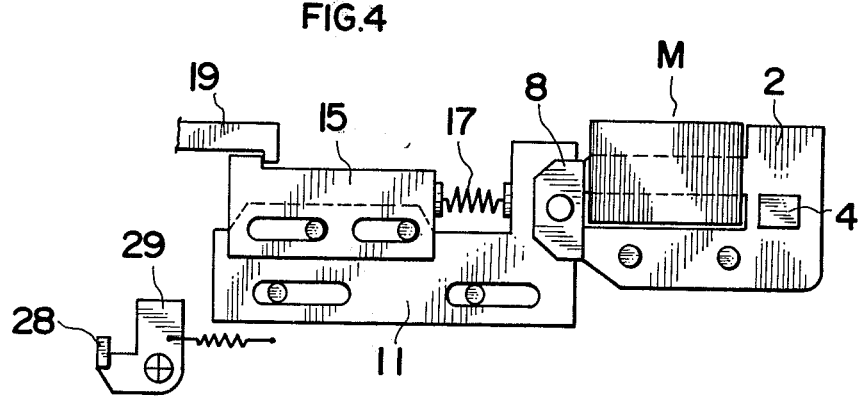

These and other objects, features and advantages of the invention will become more apparent upon a reading of the following detailed description and appended drawings wherein:

FIGS. 1 through 3 are plan views of an embodiment of the present invention, in respectively different operational modes; and FIG. 4 is a plan view of another embodiment of the present invention.

FIG. 1 is a view of the improved mechanism according to a preferred embodiment of the present invention illustrated in the cocked condition of the camera. It is to be understood that the following explanation relates to an embodiment which is associated with a shutter device including front and rear curtains driven for initiating and terminating the camera exposure and the film wind up from a rest to a charged position with the camera cocking operation. An electromagnetic device M includes a permanent magnet 4 fitted in a rectangular hole formed in a substantially U-shaped yoke 2, and a solenoid or electromagnetic coil 6 wound around a leg of the yoke. An armature piece 8 is pivotally mounted on a pin 8a, which in turn is carried by a release member 10. A charging member 14 is swingably mounted on a rotary shaft 12 on which release member 10 is coaxially swingably mounted. A biasing spring 16 is fitted on the shaft 12 and entrapped between release member 10 and charging member 14 such that the charging member 14 is urged in a direction to engage the restraining member 10 through a rising-up portion or lug 14a projecting from charging member 14. A movable member 18 is adapted to be moved to right by the roation of a gear 20 interlocking with the camera rear curtain, by way of a pin 20a located on gear 20, and to return to the left upon termination of the exposure i.e. the operation of the rear curtain. A transmission member defining bell crank 22 is rotatable about a shaft 24 and has one arm 22a maintained in engagement with release member 10 and another arm 22b swingably connected by a pin 25 to a lock member 26. An initiation lever 28 for initiating the travel of the camera front shutter curtain is arrested by a hook portion 26a of lock member 26 in the position shown in FIG. 1. Lock member 26 constitutes a link structure in combination with a pivotally movable lever 27 and the other arm 22b of transmission lever 22. A return spring 30 is fitted on rotary shaft 24 and has one end adapted to engage a bent portion 18a of movable member 18 upon termination of the camera cocking operation.

In operation, when the gear 20 is rotated clockwise in response to the camera cocking operation by means of a winding-up lever (not shown), pin 20a of gear 20 is brought into engagement with an end portion 18b of movable member 18 to thereby urge the movable member 18 to the right, whereby charging member 14 is rotated counterclockwise by a pin 18c located on the other end portion of movable member 18. Consequently, biasing spring 16 is loaded or charged through the lug portion 14a on charging member 14. The resultant biasing force of the spring 16 is high so long as the release member 10 is maintained in an inoperative position. Since the spring 16 may be comparatively strong, and no biasing force other than that of this spring acts on release member 10, the configuration and other parameters of this spring can be determined in consideration of the manufacturing cost alone, without any consideration of the balance of the biasing force relative to other biasing means.

Now the operation at the commencement of the release operation will be explained in conjunction with FIG. 2. When a release switch is closed by a release button (both not shown), then current is fed to electromagnetic coil 6 and as a result a magnetic force for offsetting the magnetic force of the permanent magnet 4 is produced in the electromagnet, thus weakening the attractive force of the electromagnetic device M. Consequently, armature piece 8 on the release member 10 which has been attracted to the electromagnetic device M by the magnetic force of permanent magnet 4 is removed from the electromagnetic device with release member 10 rotating counterclockwise under the influence of the biasing force of spring 16. The counterclockwise rotation of release member 10 rotates transmission member 22 clockwise, thereby shifting lock member 26 rightwards by way of the link system whereby initiating lever 28 is released from hook portion 26a of lock member 26 and shifted upwards. The upward shifting of initiating lever 28 allows the shutter opening operation. During the above-described movement, return spring 30 is maintained inoperative through engagement with the bent portion 18a of movable member 18, while the above operation is being effected. The initiating lever 28 in the case of a single lens reflex camera, may initiate the movement of the mirror to an upper retracted position, or the stopping-down of the camera lens diaphragm.

The shutter is thus released to commence the exposure of the film, and when the exposure is terminated after a lapse of time determined by a timing device (not shown), the mechanism of the illustrated embodiment assumes the after-exposure condition as shown in FIG. 3. More specifically, gear 20 interlocking with the rear curtain of the camera shutter is rotated counterclockwise in response to the movement of the rear curtain to a closed position, and movable member 18 is shifted leftwards under the influence of a return spring 32. Due to the shifting of movable member 18 leftwards, return spring 30 is released from restraint by bent portion 18a of movable member 18 and brought into engagement with the arm 22b of transmission member 22, thereby urging the transmission member 22 counterclockwise and with the counterclockwise rotation of transmission member 22, release member 10 is rotated clockwise. At this time, since the electromagnetic coil 6 has been deenergized with permanent magnet 4 resuming its magnetic influence or force, the armature piece 8 is again attracted to the electromagnetic device M, and hence release member 10 is magnetically retained in the position shown in FIG. 3. Since the biasing spring 16, at this time, remains in an unloaded condition, the return spring 30 may be so designed as to provide a comparatively weak biasing force.

If the camera cocking operation for advancing the film and cocking the camera mechanism including at least the shutter, is effected by means of a wind-up lever (not shown), then initiating member 28 is shifted to the cocked position while laterally displaying lock member 26 which is then returned to its home position under the action of restoration spring 30 to lock the initiating member 28. Thereafter, the rear curtain of the camera shutter is wound up, and pin 20a on gear 20 is brought into engagement with the end edge of and shifts the movable member 18 so that pin 18c engages charging member 14 and pivots same counterclockwise, whereby the separation spring 16 is loaded and restrained in the manner shown in FIG. 1. At this time, although no biasing force acts on lock member 26, release lever 28 is frictionally retained in the locked condition.

If the mechanism described above is desired to be incorporated in a single lens reflex camera, movable member 18 may be so arranged as to reciprocate in association with the operation of the reflex mirror drive mechanism, and/or the cocking of an automatic diaphragm mechanism, instead of being operated in response to the operation of the gear 20 interlocking with the rear curtain. Where the improved release mechanism is used with other types of camera, the movable member may be operated in association with the cocking of the shutter or the operation of other members according to the structure of the camera. The functions of pin 18c and bent portion 18a of movable member 18 can be achieved by separately provided members, or by way of separately provided interlocking systems, as the case may be. Charging member 14 may be supported by a shaft which is mounted on release member 10, instead of being swingably mounted on shaft 12. As an alternative, release member 10 may be so arranged as to directly lock shutter release lever 28.

FIG. 4 shows another embodiment of the present invention in which a slide plate 11 which is slideably movable leftwards and right-wards is used as a release member. A charging plate 15 is mounted on slide plate 11 and is movable relative to the slide plate 11, so as to function as a charging member. A separation spring 17 is confined between slide member 11 and charging plate 15. Shown at M is an electromagnet, at 8 an attracted armature piece, at 19 a member corresponding to movable member 18 in the device of FIG. 1, and at 29 a lock lever for arresting the shutter release lever 28 in the cocked position, the lock lever 29 being disposed with one end thereof in the moving path of slide plate 11.

We claim:
1. An electromagnetic release mechanism for a camera comprising:
  a release member for initiating a camera shutter operation, said release member being movable between an inoperative position and an operating position for the initiation of said camera shutter operation;
  permanent magnet means for retaining said release member in the inoperative position thereof;
  electromagnetic means energizable for counteracting said permanent magnet to allow the movement of said release member from said inoperative to said operating position;
  charge means including a charging member movable with and relative to said release member, and a biasing spring intercoupling said charging member and said release member and tensioned by the charging member;

a movable member movable, in response to a camera cocking operation, from a first to a second position to move said charging member relative to said release member and charge said spring to bias said release member toward the operating position thereof when said release member is retained at the inoperative position thereof;

an elastic member for driving said release member from the operating to inoperative position thereof, said movable member being engageable, at the second position thereof, with said elastic member to maintain the latter inoperative; and means for retaining said movable member at the second position thereof at least from the energization of said electromagnet to the initiation of the camera shutter operation, said movable member being releasable from said second position by means responsive to the camera shutter operation to actuate said elastic member.

2. An electromagnetic release mechanism as in claim 1 further comprising a yoke member on which said electromagnet is mounted and which has an arm and a pair of magnetic poles, and wherein said electromagnetic means includes a coil member encircling said arm, and said release member includes a rotatable release lever having an armature mounted thereon, said armature being attracted to said magnetic pole by the magnetic force of said permanent magnet.

3. An electromagnetic release mechanism as in claim 2 wherein said charging member includes a charge lever rotatable coaxially with said release lever, and said biasing spring includes a coil spring having a pair of extension arms one of which engages said release lever and the other of which engages said charge lever.

4. An electromagnetic release mechanism as in claim 1 wherein said movable member is interlocked with said retaining means whereby said retaining means moves said movable member from the first to the second position thereof in response to a shutter cocking operation and vice versa in response to a shutter operation.

5. An electromagnetic release mechanism as in claim 4 further comprising an operating member for actuating a camera mechanism, a lock member for retaining said operating member in an operative position thereof, and a link mechanism interlocking said lock member with said release member whereby the restraint on said operating member by said lock member is released when said release member moves away from the magnetic pole upon energization of said electromagnetic coil.

6. An electromagnetic release mechanism as in claim 4, wherein said elastic member is engageable with said link mechanism, and said movable member includes an engaging portion engageable with said elastic member.

7. In a camera including a cockable operating mechanism, a release mechanism for initiating the operation of said operating mechanism comprising a release member movable between an advanced position initiating the operation of said operating mechanism and a retracted position and including an armature, a charging member movable with and relative to said release member between advanced and retracted positions, spring means intercoupling said release and charging members and being loaded in response to said members being in their retracted positions and urging said release member and armature toward their advanced positions, magnet means including a permanent magnet producing a magnetic flux in said magnet means for retaining said armature and release members in their retracted positions against the influence of said loaded spring means and a solenoid which when energized counteracts said magnetic flux to release said armature and release member to advance under the influence of said loaded spring means, retracting means inoperative in the cocked position of said operating mechanism and retracted in response to the operation of said operating mechanism following the initiation thereof for resiliently retracting said release member and armature with said spring means in its unloaded condition and loading means responsive to the cocking of said operating mechanism for retracting said charging member to load said spring means.

* * * * *